US012759246B2

(12) United States Patent
Jones et al.

(10) Patent No.: US 12,759,246 B2
(45) Date of Patent: Oct. 13, 2026

(54) WOVEN FABRICS FOR COMPOSITE COMPONENTS

(71) Applicant: ROLLS-ROYCE PLC, London (GB)

(72) Inventors: Christopher D Jones, Bristol (GB); Ian Buck, Loughborough (GB); Sarvesh Dhiman, Loughborough (GB)

(73) Assignee: ROLLS-ROYCE plc, London (GB)

( * ) Notice: Subject to any disclaimer, the term of this patent is extended or adjusted under 35 U.S.C. 154(b) by 556 days.

(21) Appl. No.: 18/215,567

(22) Filed: Jun. 28, 2023

(65) Prior Publication Data

US 2024/0017503 A1 Jan. 18, 2024

(30) Foreign Application Priority Data

Jul. 14, 2022 (GB) ..................................... 2210347

(51) Int. Cl.

*B29C 70/22* (2006.01)
*B29K 677/00* (2006.01)
*B29K 707/04* (2006.01)

(52) U.S. Cl.

CPC ........ *B29C 70/222* (2013.01); *B29K 2677/00* (2013.01); *B29K 2707/04* (2013.01); *B29K 2713/00* (2013.01); *B29K 2995/0063* (2013.01)

(58) Field of Classification Search

CPC ... B29C 70/222; B29C 70/22; B29K 2677/00; B29K 2707/04; B29K 2713/00; B29K 2995/0063; B29B 11/16

See application file for complete search history.

(56) References Cited

U.S. PATENT DOCUMENTS

| | | | | |
|---|---|---|---|---|
| 4,194,540 | A | 3/1980 | Reynolds | |
| 4,741,873 | A | 5/1988 | Fischer et al. | |
| 5,360,503 | A | 11/1994 | Coffy | |
| 5,368,076 | A | 11/1994 | Curzio | |
| 7,361,618 | B2 * | 4/2008 | Homma | D03D 15/46 442/179 |
| 10,767,288 | B2 | 9/2020 | Provost et al. | |
| 2005/0085147 | A1 | 4/2005 | Homma et al. | |
| 2005/0146076 | A1 * | 7/2005 | Alexander | B29C 70/24 264/257 |
| 2007/0048491 | A1 | 3/2007 | Couri et al. | |
| 2008/0206048 | A1 | 8/2008 | Coupe et al. | |
| 2014/0110063 | A1 | 4/2014 | Mathon et al. | |
| 2015/0167208 | A1 | 6/2015 | Bischoff | |

(Continued)

FOREIGN PATENT DOCUMENTS

| | | | |
|---|---|---|---|
| CN | 111347581 | A | 6/2020 |
| EP | 0 302 989 | A2 | 2/1989 |

(Continued)

OTHER PUBLICATIONS

U.S. Appl. No. 18/215,594, filed Jun. 28, 2023 in the name of Christopher D Jones et al.

(Continued)

*Primary Examiner* — Nahida Sultana
(74) *Attorney, Agent, or Firm* — Oliff PLC

(57) ABSTRACT

A manufacturing method comprises: providing a woven fabric comprising a plurality of reinforcing fibre tows and a plurality of thermoplastic polymer yarns woven together; and moulding the woven fabric in a heated mould to form a preform for a composite component.

13 Claims, 3 Drawing Sheets

(56) References Cited

U.S. PATENT DOCUMENTS

| | | | |
|---|---|---|---|
| 2015/0174833 A1 | 6/2015 | Desjoyeaux | |
| 2015/0274311 A1 | 10/2015 | Briand | |
| 2016/0059498 A1* | 3/2016 | Graf | B29C 70/545 264/258 |
| 2016/0243772 A1* | 8/2016 | Riehl | B29B 13/023 |
| 2018/0363175 A1* | 12/2018 | Bayraktar | D03D 25/005 |
| 2019/0030840 A1 | 1/2019 | Camus et al. | |
| 2019/0062962 A1 | 2/2019 | Hellot et al. | |
| 2019/0292720 A1* | 9/2019 | Lin | C01B 32/194 |
| 2020/0206978 A1 | 7/2020 | Six et al. | |
| 2020/0385898 A1* | 12/2020 | Chiu | D03D 15/587 |
| 2021/0237316 A1* | 8/2021 | Guha | B29C 70/22 |
| 2021/0370620 A1 | 12/2021 | Kuntz | |
| 2023/0192562 A1* | 6/2023 | Read | C04B 35/80 501/95.2 |

FOREIGN PATENT DOCUMENTS

| | | | |
|---|---|---|---|
| EP | 0 539 996 | A1 | 5/1993 |
| EP | 0 909 845 | A1 | 4/1999 |
| EP | 1 357 211 | A1 | 10/2003 |
| EP | 1 464 743 | A1 | 10/2004 |
| EP | 2 662 480 | A1 | 11/2013 |
| EP | 3 006 489 | A1 | 4/2016 |
| EP | 3 288 746 | A1 | 3/2018 |
| EP | 4 079 470 | A1 | 10/2022 |
| FR | 3 033 279 | A1 | 9/2016 |
| FR | 3 054 842 | A1 | 2/2018 |
| FR | 3 066 429 | A1 | 11/2018 |
| GB | 1190214 | A | 4/1970 |
| JP | 2002-138344 | A | 5/2002 |
| JP | 2006-233341 | A | 9/2006 |
| JP | 5002895 | B2 | 8/2012 |
| JP | 2020-100922 | A | 7/2020 |
| JP | 2022-054847 | A | 4/2022 |
| KR | 10-2009-0102565 | A | 9/2009 |
| WO | 2016/174401 | A1 | 11/2016 |
| WO | 2019/027385 | A2 | 2/2019 |

OTHER PUBLICATIONS

U.S. Appl. No. 18/215,558, filed Jun. 28, 2023 in the name of Christopher D Jones et al.

Jan. 13, 2023 combined Search and Examination Report issued in British Patent Application No. 2210348.5.

Jan. 4, 13, 2023 combined Search and Examination Report issued in British Patent Application No. 2210347.7.

Jan. 5, 16, 2023 combined Search and Examination Report issued in British Patent Application No. 2210346.9.

Jun. 6, 28, 2023 combined Examination and Search Report issued in British Patent Application No. 2210347.7.

Jun. 7, 30, 2023 combined Search and Examination Report issued in British Patent Application No. 2210348.5.

Jan. 28, 2025 Notice of Allowance issued in U.S. Appl. No. 18/215,594.

Nov. 23, 2023 partial Search Report issued in European Patent Application No. 23180708.2.

Dec. 7, 2023 extended Search Report issued in European Patent Application No. 23180707.4.

Dec. 7, 2023 extended Search Report issued in European Patent Application No. 23180705.8.

* cited by examiner

WOVEN FABRICS FOR COMPOSITE COMPONENTS

CROSS-REFERENCE TO RELATED APPLICATIONS

This specification is based upon and claims the benefit of priority from United Kingdom patent application number GB 2210347.7 filed on Jul. 14, 2022, the entire contents of which is incorporated herein by reference.

BACKGROUND

Field of the Disclosure

The present disclosure concerns woven fabrics, preforms and composite components formed from woven fabrics, and associated methods of manufacture.

Description of the Related Art

Fibre reinforced composite materials, such as carbon fibre or glass fibre reinforced polymeric materials, are commonly used to produce aerospace and automotive components, as well as in civil engineering, sporting goods and various other applications.

A fibre reinforced composite material comprises a fibre-based reinforcement and a matrix material. In a fibre reinforced polymeric material, the matrix material is a polymer, typically a thermosetting polymer such as an epoxy resin. The fibre reinforcement may take many different forms and reinforcing fibres may be arranged randomly or in an ordered fashion within the matrix, leading to different material properties.

Of particular interest are woven reinforcing fibre fabrics, in which a plurality of reinforcing fibre tows are woven together to produce 2D or 3D fabric structures. Different weaving patterns can be chosen to tailor mechanical properties of the resultant component. A 2D woven fabric has a two-dimensional, single sheet-like structure, with x and y (warp and weft) weaving directions lying "in plane". A 3D woven fabric includes multiple x-y layers and also reinforcing fibre tows running in a z (binder) weaving direction.

2D woven fabrics tend to exhibit superior mechanical properties in plane in comparison to non-woven alternatives. 2D woven fabrics can be cut and multiple layers laid up to form a laminate having a desired shape and/or thickness.

The presence of z or binder tows provides 3D woven fabrics with enhanced mechanical properties in the out of plane direction as compared with 2D woven fabrics. The use of 3D woven fabrics also enables manufacture of near-net-shape preforms for composite components.

However, there are several drawbacks associated with manufacturing components from reinforcing fibre fabrics. For example, fibre reinforced composite materials can lack toughness. It is also common for air to become trapped in voids within woven structures, making it difficult to achieve final component dimensions within desired manufacturing tolerances and difficult to fill woven preforms completely with matrix material. Shaped woven preforms are also typically flexible and easily deformed during handling or transport prior to matrix material infiltration.

Seeking to address some of these problems, powder binder is often used to assist in compaction and stabilisation of woven fabrics when making preforms. However, use of powder binder can damage weaving apparatus, is a health hazard and is also often ineffective, as it can be difficult to distribute powder binder evenly throughout a woven structure.

Improvements in woven fabrics would therefore be desirable.

SUMMARY OF THE DISCLOSURE

According to a first aspect, a manufacturing method comprises: providing a woven fabric comprising a plurality of reinforcing fibre tows and a plurality of thermoplastic polymer yarns woven together (i.e., interwoven); and moulding the woven fabric in a heated mould to form a preform for a composite component.

The woven fabric may be a two-dimensional (2D) woven fabric in which the plurality of reinforcing fibre tows and the plurality of thermoplastic yarns are woven into a 2D structure. Alternatively, the woven fabric may be a three-dimensional (3D) woven fabric in which the plurality of reinforcing fibre tows and the plurality of thermoplastic yarns are woven into a 3D structure.

It will be appreciated that a 3D woven fabric is a fabric formed by weaving reinforcing fibre tows in three dimensions, known as x, y and z directions (or warp, weft and binder directions). 3D woven fabrics can be contrasted with 2D woven fabrics formed by weaving reinforcing fibre tows in two dimensions, known as x and y directions (or warp and weft directions).

A 2D woven fabric has a two-dimensional, single sheet-like structure, with the x and y (warp and weft) directions lying "in plane". In contrast, a 3D woven fabric includes multiple x-y layers and also reinforcing fibre tows running in the z (binder) direction. 3D woven fabrics are therefore typically thicker than 2D woven fabrics (i.e., in the z, "out of plane" direction).

The presence of z or binder tows in the 3D structure provides a 3D woven fabric with enhanced mechanical properties in the out of plane direction as compared with a single 2D woven fabric.

A composite component can be manufactured directly from a single 3D woven fabric, which is inherently multi-layered, whereas composite preforms manufactured using 2D woven fabrics typically require the laying up of multiple individual sheets of 2D woven fabric to form a laminate having a desired thickness and/or shape. In composite components manufactured using conventional 2D woven fabrics, individual sheets of 2D woven fabric are typically bonded to one another only through matrix material. Delamination of individual fabric sheets, and thus impaired impact performance and damage tolerance, can therefore be weaknesses of composite components manufactured using conventional 2D woven fabrics. In contrast, 3D woven fabrics exhibit much greater resistance to delamination due to the presence of binder fibre tows holding layers of the fabric together. 3D weaving techniques also enable near-net-shape preforms to be manufactured, reducing manufacturing and machining costs, as well as material waste.

The 3D structure of conventional 3D woven fabrics can, however, lead to manufacturing problems. In particular, as a result of the weaving process, the 3D structure typically includes air trapped in voids between reinforcing fibre tows (this is known as "lofting"). When a composite component is manufactured using a conventional 3D woven fabric, the 3D woven fabric is typically first shaped, compressed (i.e., compacted) and stabilised to form a preform, and then the preform is filled with matrix material (for example, by injecting resin into the preform within a resin transfer mould). Compaction of the fabric expels trapped air, facilitating matrix material infiltration and enabling dimensional control. For example, for use in resin transfer moulding, the thickness of the compacted preform must typically be within about 10% of the desired final component thickness to enable a resin transfer mould to close. Stabilisation is typically necessary because otherwise the 3D woven fabric remains excessively flexible and is easily deformed when transferring from a compaction mould to a resin transfer mould.

At present, compaction and stabilisation of 3D woven fabrics are typically assisted by application of powder binder (e.g., uncured resin powder) to the 3D woven structure. The powder binder can be applied to individual reinforcing fibre tows, or it can be applied directly to the 3D woven fabric as it comes off a loom. The 3D woven fabric is heated during compaction and stabilisation, causing the powder binder to melt and bind reinforcing fibre tows of the 3D woven structure together. However, this method suffers several drawbacks. First, use of powder binder typically leaves resin residue on loom components (e.g., Jacquard eyelets), which therefore require more frequent maintenance. Second, powder binder is a skin irritant, and its use is therefore a health hazard for loom operators. Third, it can be difficult to distribute powder binder evenly throughout a 3D woven fabric. This is particularly difficult when the powder binder is applied manually, but even when application is automated, it is often not possible to achieve a completely uniform distribution.

The present inventors, however, have found that by weaving a plurality of thermoplastic polymer yarns into the 3D structure of a 3D woven fabric, superior compaction and stabilisation can be achieved without the need for powder binder. When the 3D woven fabric is moulded in the heated mould, the thermoplastic polymer yarns melt and bond adjacent reinforcing fibre tows together. When cooled, the reinforcing fibre tows remain bonded together, such that the fabric is locked into the compacted shape and the resultant preform is effectively stabilised against deformation during transfer and handling before it is loaded into a resin transfer mould. The thermoplastic polymer yarns can be woven into the 3D structure using standard weaving apparatus, do not lead to increases in maintenance requirements and do not pose a health hazard. The placement of the thermoplastic polymer yarns within the 3D woven structure of the 3D woven fabric can also be controlled accurately, enabling even distribution throughout the fabric regardless of the particular weave pattern.

The inventors have also found that by weaving thermoplastic polymer yarns into the 2D structure of a 2D woven fabric, superior stabilisation can also be achieved. When a preform is prepared by laying up multiple individual sheets of 2D woven fabric to form a laminate having a desired thickness and/or shape, melting and subsequent cooling of the thermoplastic polymer yarns can also assist in bonding adjacent sheets together. In addition, incorporation of thermoplastic polymer throughout the layers of 2D woven fabric can increase the toughness of the resultant composite component.

Accordingly, in embodiments in which the woven fabric is a 2D woven fabric, the method may comprise: stacking (e.g., laying up) two or more layers of 2D woven fabric on top of one another to form a stack; and moulding the stack in the heated mould to form the preform for the composite component.

The two or more layers of 2D woven fabric may be stacked directly on top of one another, for example, such that the two or more layers of 2D woven fabric are in direct contact with one another. Alternatively, the two or more layers of 2D woven fabric may be stacked on top of one another such that the two or more layers of 2D woven fabric are spaced apart from one another by one or more intervening layers. Said one or more intervening layers may comprise one or more layers of non-woven reinforcing fibres, one or more layers of 3D woven fabric, and/or one or more layers of polymeric material (such as thermoplastic polymeric material).

The two or more layers of 2D woven fabric may be two or more layers of the same (i.e., same type of) 2D woven fabric. Alternatively, the two or more layers of 2D woven fabric may comprise two or more layers of different (i.e., different types of) 2D woven fabric.

At least one of the two or more layers of 2D woven fabric comprises the 2D woven fabric comprising the plurality of reinforcing fibre tows and the plurality of thermoplastic polymer yarns woven together. It may be that two or more (e.g., each) of the two or more layers of 2D woven fabric comprise 2D woven fabric comprising a respective plurality of reinforcing fibre tows and a respective plurality of thermoplastic polymer yarns woven together.

The method may comprise stacking the two or more layers of 2D woven fabric on top of one another to form a laminate. The method may comprise stacking a sufficient number of the layers of 2D woven fabric on top of another to achieve a target laminate thickness.

The method may comprise heating the (e.g., 2D or 3D) woven fabric (i.e., in the heated mould) to a temperature no less than about 50° C., for example, no less than about 75° C., or no less than about 90° C., or no less than about 100° C., or no less than about 125° C., or no less than about 150° C., or no less than about 175° C., or no less than about 200° C. The method may comprise heating the (e.g., 2D or 3D) woven fabric (i.e., in the heated mould) to a temperature no greater than about 250° C., for example, no greater than about 225° C., or no greater than about 200° C., or no greater than about 175° C., or no greater than about 150° C., or no greater than about 125° C., or no greater than about 100° C. The method may comprise heating the (e.g., 2D or 3D) woven fabric (i.e., in the heated mould) to a temperature from about 50° C. to about 250° C., for example, from about 50° C. to about 225° C., or from about 50° C. to about 200° C., or from about 50° C. to about 175° C. or from about 50° C. to about 150° C., or from about 50° C. to about 125° C., or from about 50° C. to about 100° C., or from about 75° C. to about 250° C., or from about 100° C. to about 250° C., or from about 125° C. to about 250° C., or from about 150° C. to about 250° C., or from about 175° C. to about 250° C., or from about 200° C. to about 250° C. It will be appreciated that a suitable heating temperature may be selected based on the nature (e.g., chemical composition, linear density and/or quantity) of the thermoplastic polymer yarns used. For example, when using the thermoplastic polyester yarn Grilon® KE-60 produced by EMS-GRIVORY, a division of EMS-CHEMIE AG, Switzerland, with the woven carbon intermediate modulus 7 (IM7) fabric from the HexTow® line available from Hexcel Corporation, USA, the method comprises heating to approximately 95° C.

The method may comprise heating the (e.g., 2D or 3D) woven fabric (i.e., in the heated mould) for no less than about 10 seconds, for example, no less than about 30 seconds, or no less than about 1 minute, or no less than about 2 minutes. The method may comprise heating the (e.g., 2D or 3D) woven fabric (i.e., in the heated mould) for no greater than about 10 minutes, for example, no greater than about 5 minutes, or no greater than about 2 minutes, or no greater than about 1 minute. The method may comprise heating the (e.g., 2D or 3D) woven fabric (i.e., in the heated mould) for from about 10 seconds to about 10 minutes, for example, from about 10 seconds to about 5 minutes, or from about 30 seconds to about 5 minutes, or from about 1 minute to about 10 minutes, or from about 1 minute to about 5 minutes. It will be appreciated that the required length of time for which the (e.g., 2D or 3D) woven fabric should be heated may depend on the temperature to which the (e.g., 2D or 3D) woven fabric is heated and the nature (e.g. chemical composition, linear density and/or quantity) of the thermoplastic polymer yarns used. For example, when using Grilon® KE-60 with woven carbon fabric IM7, the heating process can be performed quite slowly, rising from ambient room temperature (e.g. 17° C.) to around 95° C. over the course of around 4.5 hours. The illustrative values given here vary over a wide range, but the skilled person familiar with the materials and fabrics used will be familiar with the temperatures at which the thermoplastic polymer yarns melt and bond adjacent reinforcing fibre tows together.

The method may comprise cooling the preform prior to removal from the mould. The method may comprise cooling the preform to no greater than about 50° C., for example, no greater than about 40° C., or no greater than about 30° C., or no greater than about 25° C., for example, to room temperature, prior to removal from the mould. Cooling the preform prior to removal from the mould may ensure dimensional stability of the preform for subsequent handling and/or transfer to a resin transfer mould. If the preform is not cooled sufficiently prior to removal from the mould, it may be easily deformed and/or the exterior of the preform may be tacky. It will be appreciated that the temperature to which the preform should be cooled will depend on the nature (e.g. chemical composition, linear density and/or quantity) of the thermoplastic polymer yarns used. For example, when using Grilon® KE-60 with IM7, the cooling process can be performed quite slowly, dropping from 95° C. to ambient room temperature (e.g. 17° C.) over the course of 6 to 10 hours.

The method may comprise raising the temperature of the (e.g., 2D or 3D) woven fabric (i.e., in the heated mould) to a maximum heating temperature and then immediately allowing the (e.g., 2D or 3D) woven fabric to cool within the mould.

The heated mould may be preheated prior to placing the (e.g., 2D or 3D) woven fabric within the mould.

The mould may be a 3D shaped mould. The preform may therefore be a 3D shaped preform.

It will be appreciated that a 3D shaped mould is a mould which has a 3D shaped interior mould cavity, i.e., such that the mould is configured to produce a 3D shaped preform. That is to say, the 3D shaped mould is configured to impart a 3D shape to the (e.g., 2D or 3D) woven fabric. The 3D shaped mould is not a flat mould comprising, for example, two opposing flat plates (e.g., platens). Thus, the 3D shaped mould is configured to shape the (e.g., 2D or 3D) woven fabric at the same time as compressing (i.e., compacting) the (e.g., 2D or 3D) woven fabric.

Alternatively, the mould may be a 2D shaped mould. The preform may therefore be a 2D shaped preform.

It will be appreciated that a 2D shaped mould is a mould which has a 2D shaped interior mould cavity, i.e., such that the mould is configured to produce a 2D shaped preform. That is to say, the 2D shaped mould is configured to impart a 2D (e.g., flat, sheet-like) shape to the (e.g., 2D or 3D) woven fabric. The 2D shaped mould may therefore be a flat mould comprising, for example, two opposing flat plates (e.g., platens).

One or more of (e.g., each of) the thermoplastic polymer yarns may have a (i.e., direct) linear density no less than about 100 dtex, for example, no less than about 110 dtex, or no less than about 150 dtex, or no less than about 200 dtex. One or more of (e.g., each of) the thermoplastic polymer yarns may have a (i.e., direct) linear density no greater than about 350 dtex, for example, no greater than about 330 dtex, or no greater than about 300 dtex, or no greater than about 250 dtex. One or more of (e.g., each of) the thermoplastic polymer yarns may have a (i.e., direct) linear density from about 100 dtex to about 350 dtex, for example, from about 110 dtex to about 330 dtex, or from about 150 dtex to about 300 dtex. It will be appreciated that the (i.e., direct) linear density of a yarn is the weight of the yarn per unit length. Linear density is typically measured in units of tex (grams per 1000 metres of yarn) or dtex (grams per 10000 metres of yarn). The (i.e., direct) linear density may be measured according to ISO 1973:2021. The inventors have found that, when the linear density of the thermoplastic polymer yarns is too low (for example, below about 100 dtex, e.g., below about 110 dtex), the yarns tend to break during weaving. The inventors have also found that, when the linear density of the thermoplastic polymer yarns is too high (for example, above about 350 dtex, e.g., above about 330 dtex), the yarns can become difficult to weave and there are minimal further improvements in compaction or stabilisation.

Each thermoplastic polymer yarn comprises thermoplastic polymer. It will be appreciated that a thermoplastic polymer is a polymer which becomes pliable or mouldable at elevated temperatures and which solidifies upon cooling. Thermoplastic polymers can be contrasted with thermosetting polymers which are polymers obtained by irreversibly curing soft or liquid prepolymers and which cannot be melted or reshaped following curing.

Each thermoplastic polymer yarn may be formed predominantly, for example, entirely, from thermoplastic polymer. For example, each thermoplastic polymer yarn may comprise no less than about 90 wt. %, for example, no less than about 95 wt. %, or no less than about 99 wt. %, for example, about 100 wt. %, thermoplastic polymer.

One or more of (e.g., each of) the thermoplastic polymer yarns may be formed from a single thermoplastic polymer. Alternatively, one or more of (e.g., each of) the thermoplastic polymer yarns may be formed from two or more different thermoplastic polymers. The or each thermoplastic polymer may be a homopolymer or a copolymer. The or each thermoplastic polymer may be an elastomeric thermoplastic polymer.

Each thermoplastic polymer yarn may be formed from the same polymer or polymers. Alternatively, some or all of the thermoplastic polymer yarns may be formed from different polymers.

For example, one or more of (e.g., each of) the thermoplastic polymer yarns may comprise (e.g., consist essentially of, consist of or be formed from) one or more of: polyacrylic acids; acrylonitrile butadiene styrene; polyamides; polylactic acids; polycarbonates; polyether sulfones; polyoxymethylene; polyether ether ketones; polyetherimides; polyolefins (i.e., polyalkenes) such as polyethylene and/or polypropylene; polystyrene; polyvinyl chloride; polyvinylidene fluoride; and/or polytetrafluoroethylene.

One or more of (e.g., each of) the thermoplastic polymer yarns may comprise (e.g., consist essentially of, consist of or be formed from) a polyamide. The polyamide may be an aliphatic polyamide such as nylon 6 or nylon 6,6 (i.e., PA 6 or PA 66). The polyamide may be a polyphthalamide such as PA 6T. The polyamide may be an aromatic polyamide (i.e., an aramid) such as Kevlar®, Nomex®, Twaron®, Technora® or Kermel®.

One or more of (e.g., each of) the thermoplastic polymer yarns may be formed from an aliphatic polyamide such as nylon 6 or nylon 6,6 (i.e., PA 6 or PA 66), for example, available in the Grilon® line produced by EMS-GRIVORY, a division of EMS-CHEMIE AG, Switzerland.

The (e.g., 2D or 3D) woven fabric may comprise no less than about 1.0 wt. %, for example, no less than about 1.2 wt. %, or no less than about 1.4 wt. %, or no less than about 1.5 wt. %, or no less than about 2.0 wt. %, or no less than about 3.0 wt. %, or no less than about 3.5 wt. %, thermoplastic polymer yarn. The (e.g., 2D or 3D) woven fabric may comprise no greater than about 8.0 wt. %, for example, no greater than about 7.5 wt. %, or no greater than about 7.0 wt. %, or no greater than about 6.5 wt. %, or no greater than about 6.0 wt. %, or no greater than about 5.5 wt. %, or no greater than about 5.4 wt. %, or no greater than about 5.2 wt. %, or no greater than about 5.0 wt. %, or no greater than about 4.0 wt. %, thermoplastic polymer yarn. The (e.g., 2D or 3D) woven fabric may comprise from about 1.0 wt. % to about 8.0 wt. %, for example, from about 1.0 wt. % to about 7.5 wt. %, or from about 1.2 wt. % to about 5.4 wt. %, or from about 1.4 wt. % to about 5.4 wt. %, or from about 1.4 wt. % to about 5.2 wt. %, or from about 1.5 wt. % to about 5.0 wt. %, or from about 2.0 wt. % to about 5.0 wt. %, or from about 1.5 wt. % to about 4.0 wt. %, thermoplastic polymer yarn.

The (e.g., 2D or 3D) woven fabric may comprise no less than about 1.0 wt. %, for example, no less than about 1.2 wt. %, or no less than about 1.4 wt. %, or no less than about 1.5 wt. %, or no less than about 2.0 wt. %, or no less than about 3.0 wt. %, or no less than about 3.5 wt. %, aliphatic polyamide such as nylon 6 or nylon 6,6 (i.e., PA 6 or PA 66), for example, available in the Grilon® line produced by EMS-GRIVORY, a division of EMS-CHEMIE AG, Switzerland. The (e.g., 2D or 3D) woven fabric may comprise no greater than about 8.0 wt. %, for example, no greater than about 7.5 wt. %, or no greater than about 7.0 wt. %, or no greater than about 6.5 wt. %, or no greater than about 6.0 wt. %, or no greater than about 5.5 wt. %, or no greater than about 5.4 wt. %, or no greater than about 5.2 wt. %, or no greater than about 5.0 wt. %, or no greater than about 4.0 wt. %, aliphatic polyamide such as nylon 6 or nylon 6,6 (i.e., PA 6 or PA 66), for example, available in the Grilon® line produced by EMS-GRIVORY, a division of EMS-CHEMIE AG, Switzerland. The (e.g., 2D or 3D) woven fabric may comprise from about 1.0 wt. % to about 8.0 wt. %, for example, from about 1.0 wt. % to about 7.5 wt. %, or from about 1.2 wt. % to about 5.4 wt. %, or from about 1.4 wt. % to about 5.4 wt. %, or from about 1.4 wt. % to about 5.2 wt. %, or from about 1.5 wt. % to about 5.0 wt. %, or from about 2.0 wt. % to about 5.0 wt. %, or from about 1.5 wt. % to about 4.0 wt. %, aliphatic polyamide such as nylon 6 or nylon 6,6 (i.e., PA 6 or PA 66), for example, available in the Grilon® line produced by EMS-GRIVORY, a division of EMS-CHEMIE AG, Switzerland.

It will be appreciated that a reinforcing fibre tow is a bundle of reinforcing fibres (typically in the form of continuous filaments). The reinforcing fibres in a reinforcing fibre tow are typically untwisted.

The size of a reinforcing fibre tow can be quantified by the number of fibres (i.e., filaments) in the tow. Each of the reinforcing fibre tows may contain no less than about 3000 reinforcing fibres, for example, or no less than about 6000 reinforcing fibres, or no less than about 12000 reinforcing fibres. Each of the reinforcing fibre tows may contain no more than about 12000 reinforcing fibres, for example, or no more than about 6000 reinforcing fibres, or no more than about 32000 reinforcing fibres. Each of the reinforcing fibre tows may contain from about 3000 to about 12000 reinforcing fibres. Each of the reinforcing fibre tows may be 3K, 6K or 12K reinforcing fibre tows.

The reinforcing fibre tows may be spread tows. It will be appreciated that a spread tow is formed by spreading out a reinforcing fibre tow to form a thin, flat unidirectional tape. Alternatively, the reinforcing fibre tows may be conventional, non-spread tows.

The reinforcing fibre tows may be made of any suitable material for a given application. For example, the reinforcing fibre tows may be carbon fibre tows, for example, obtained from the HexTow® line available from Hexcel Corporation, USA, or the TORAYCA® line available from Toray Composite Materials America, Inc., USA. Alternatively, the reinforcing fibre tows may be glass fibre tows, aramid fibre tows or basalt fibre tows.

One or more (e.g., each) of the plurality of thermoplastic polymer yarns may be woven into the (e.g., 2D or 3D) structure of the (e.g., 2D or 3D) woven fabric parallel to a (i.e., corresponding) reinforcing fibre tow. That is to say, one or more of (e.g., each) of the one or more thermoplastic polymer yarns may be fed into the weaving apparatus with a (i.e., corresponding) reinforcing fibre tow so that each said thermoplastic polymer yarn runs through the (e.g., 2D or 3D) structure along (e.g., beside) the (i.e., corresponding) reinforcing fibre tow.

One or more (e.g., each) of the plurality of thermoplastic polymer yarns may be woven into the (e.g., 2D or 3D) structure within a reinforcing fibre tow. For example, one or more (e.g., each) of the one or more thermoplastic polymer yarns may be fed into the weaving apparatus sandwiched within a (i.e., corresponding) reinforcing fibre tow. The reinforcing fibre tow within which the one or more thermoplastic polymer yarns is sandwiched may itself be a composite reinforcing fibre tow comprising two or more reinforcing fibre tows. For example, one or more thermoplastic polymer yarns may be sandwiched between two reinforcing fibre tows to form a composite reinforcing tow. Alternatively, one or more thermoplastic polymer yarns may be sandwiched between three reinforcing fibre tows, or four reinforcing fibre tows, or five reinforcing fibre tows, and so on. The number of reinforcing fibre tows used to form the composite reinforcing fibre tow may be selected based on the tow ratings of each of the available reinforcing fibre tows (i.e., the number of fibres bundled together to form each tow) to target a desired tow rating for the composite reinforcing fibre tow.

For example, one or more (e.g., each) of the one or more thermoplastic polymer yarns may be fed into the weaving apparatus sandwiched within a (i.e., corresponding) 12K carbon fibre tow. For example, one or more (e.g., each) of the one or more thermoplastic polymer yarns may be fed into the weaving apparatus sandwiched within a (i.e., corresponding) 12K carbon fibre tow, wherein each 12K carbon fibre tow is a composite carbon fibre tow made up of two 6K carbon fibre tows, the thermoplastic polymer yarn being disposed between the two 6K carbon fibre tows. Alternatively, one or more (e.g., each) of the one or more thermoplastic polymer yarns may be fed into the weaving apparatus sandwiched within a (i.e., corresponding) 12K carbon fibre tow, wherein each 12K carbon fibre tow is a composite carbon fibre tow made up of four 3K carbon fibre tows, the thermoplastic polymer yarn being disposed between the four 3K carbon fibre tows.

One or more (e.g., each) of the plurality of thermoplastic polymer yarns may be woven into the (e.g., 2D or 3D) structure twisted into and/or around a (i.e., corresponding) reinforcing fibre tow.

The thermoplastic polymer yarns may be distributed evenly throughout the (e.g., 2D or 3D) woven fabric. For example, the thermoplastic polymer yarns may be woven into the (e.g., 2D or 3D) woven fabric with a regular spacing, i.e., the thermoplastic polymer yarns may be spaced evenly apart within the (e.g., 2D or 3D) woven structure. For example, it may be that a thermoplastic polymer yarn is woven into the 2D woven fabric with every weft and/or warp reinforcing fibre tow, or with every second weft and/or warp reinforcing fibre tow, or with every third weft and/or warp reinforcing fibre tow, and so on, depending on the amount of thermoplastic polymer required. Alternatively, it may be that a thermoplastic polymer yarn is woven into the 3D woven fabric with every weft, warp and/or binder reinforcing fibre tow, or with every second weft, warp and/or binder reinforcing fibre tow, or with every third weft, warp and/or binder reinforcing fibre tow, and so on, depending on the amount of thermoplastic polymer required.

The method may comprise weaving the plurality of reinforcing fibre tows and the plurality of thermoplastic polymer yarns together, thereby producing the (e.g., 2D or 3D) woven fabric. The method may comprise weaving at least some of (e.g., all of) the plurality of thermoplastic polymer yarns in the weft direction. The method may further comprise weaving some of the plurality of thermoplastic polymer yarns in the warp direction (for a 2D or 3D woven fabric) and/or the binder direction (for a 3D woven fabric).

The (e.g., 2D or 3D) woven fabric may be woven using any suitable weaving apparatus, i.e., a loom. It will be appreciated that a loom is in general a machine used to weave fabric from thread, yarn and/or tows. In the context of the present specification and the appended claims, a loom may be any type of loom suitable for weaving reinforcing fibre tows into woven reinforcing fibre fabrics. For example, the loom may be any suitable type of Dobby loom or Jacquard loom. Suitable looms are available from, for example, Lindauer Dornier GmbH, Germany.

In examples in which the woven fabric is a 3D woven fabric, the 3D structure of the 3D woven fabric may be a through-thickness interlock structure or a layer-to-layer interlock structure. It will be appreciated that, in a through-thickness interlock structure, binder reinforcing fibre tows (and/or thermoplastic polymer yarns, if woven in the binder direction) penetrate through the entire thickness of the fabric (i.e. in the z direction), whereas in a layer-to-layer interlock structure, binder reinforcing fibre tows (and/or thermoplastic polymer yarns, if woven in the binder direction) only hold adjacent layers together.

The 3D structure of the 3D woven fabric may be an angle interlock structure or an orthogonal interlock structure. It will be appreciated that, in an angle interlock structure, an interlacing angle between binder reinforcing fibre tows (and/or thermoplastic polymer yarns, if woven in the binder direction) and weft reinforcing fibre tows (and/or thermoplastic polymer yarns, if woven in the weft direction) is less than or greater than about 90°, whereas in an orthogonal interlock structure, the interlacing angle between binder reinforcing fibre tows (and/or thermoplastic polymer yarns, if woven in the binder direction) and weft reinforcing fibre tows (and/or thermoplastic polymer yarns, if woven in the weft direction) is about 90°.

The 2D structure of the 2D woven fabric, or the 3D structure of the 3D woven fabric, may have any suitable weaving pattern, such as plain, twill or satin.

The method may further comprise introducing matrix material into the preform to form a composite component or part thereof. The matrix material may be an organic (i.e., polymeric) matrix material such as an epoxy resin, a phenolic resin, an amino resin, a cyanate ester resin, a polyurethane, a polyimide, a polyamide or a bismaleimide. The matrix material may be a thermosetting organic (i.e., polymeric) matrix material. The matrix material is typically introduced into the preform in a liquid form and then cured to form a solid.

The method may comprise injecting the matrix material into the preform in a resin transfer mould (RTM).

The method may comprise forming two or more parts of a composite component by introducing matrix material into two or more preforms manufactured by any of the methods described hereinabove and then assembling the composite component from the two or more parts.

The method may comprise forming two or more preforms by any of the methods described hereinabove, assembling the two or more preforms to form a preform assembly for the composite component or part thereof, and then introducing matrix material into the preform assembly to form the composite component or part thereof. Assembling the two or more preforms to form the preform assembly may comprise adhering the two or more preforms together, for example, by way of the thermoplastic polymeric material. For example, the method may comprise heating the two or more preforms together so that the thermoplastic polymeric material melts and adheres the two or more preforms together. Alternatively, the method may comprise bringing the two or more preforms together while the two or more preforms are still warm (for example, from an initial heating of the (e.g., 2D or 3D) woven fabric during compaction and stabilisation) such that the thermoplastic polymeric material is tacky.

In some examples, the (e.g., 2D or 3D) woven fabric may be impregnated with partially cured polymeric matrix material and/or one or more precursors for (i.e., which can react to form) polymeric matrix material. The polymeric matrix material is typically a thermosetting polymeric matrix material, such as an epoxy resin, a phenolic resin, an amino resin, a cyanate ester resin, a polyurethane, a polyimide, a polyamide or a bismaleimide. The one or more precursors for the polymeric matrix material may comprise a resin and a hardener. Accordingly, the (e.g., 2D or 3D) woven fabric may be a pre-impregnated or "pre-preg" woven fabric.

In examples in which the (e.g., 2D or 3D) woven fabric is impregnated with partially cured polymeric matrix material and/or one or more precursors for polymeric matrix material, the method may comprise laying up (e.g., multiple layers of) the pre-impregnated (e.g., 2D or 3D) woven fabric to form a preform and curing the preform, for example, by the application of heat and/or pressure (e.g., in an oven or an autoclave). In such examples, the thermoplastic polymer yarn may provide the final composite component with enhanced toughness.

According to a second aspect, there is provided a preform for a composite component manufactured by the method according to the first aspect.

According to a third aspect, there is provided a composite component manufactured by the method according to the first aspect.

For each of the second and third aspect, the composite component may be an aircraft component.

The composite component may be a component of a gas turbine engine.

The composite component may be, for example, a panel, a stator vane, a hollow structure, or a structural frame.

The composite component may be a 3D shaped composite component. It will be appreciated that a 3D shaped composite component has a macroscopic 3D shape, i.e., the 3D shaped composite component is not entirely flat (e.g., not sheet-like).

Alternatively, the composite component may be a 2D shaped composite component. It will be appreciated that a 2D shaped composite component is flat or sheet-like.

According to a fourth aspect, there is provided a composite component comprising a fibre-reinforced composite material, the fibre-reinforced composite material comprising a polymeric matrix and a woven fabric reinforcement, wherein the woven fabric reinforcement comprises a plurality of reinforcing fibre tows woven together (i.e., interwoven) and bonded to one another in part by thermoplastic polymeric material different from the polymeric matrix.

The composite component may be formed entirely from the fibre-reinforced composite material. Alternatively, it may be that one or more portions of the composite component are formed from the fibre-reinforced composed material.

The polymeric matrix may comprise (e.g. consist of, or consist essentially of) polymeric matrix material such as an epoxy resin, a phenolic resin, an amino resin, a cyanate ester resin, a polyurethane, a polyimide, a polyamide or a bismaleimide. The polymeric matrix material may be a thermosetting polymeric matrix material.

The plurality of reinforcing fibre tows woven together constitute a woven fabric. The woven fabric may have any of the properties of the woven fabric described hereinabove with regard to the first aspect.

In particular, the woven fabric may be a 2D woven fabric in which the plurality of reinforcing fibre tows are woven into a 2D structure. Alternatively, the woven fabric may be a 3D woven fabric in which the plurality of reinforcing fibre tows are woven into a 3D structure.

Accordingly, the woven fabric reinforcement may be a 2D woven fabric reinforcement comprising a 2D woven fabric. Alternatively, the woven fabric reinforcement may be a 3D woven fabric reinforcement comprising a 3D woven fabric.

The woven fabric reinforcement may comprise a plurality of layers. For example, the woven fabric reinforcement may comprise two or more layers of woven fabric. For example, the woven fabric reinforcement may comprise two or more layers of 2D woven fabric.

For example, the woven fabric reinforcement may comprise two or more layers of 2D woven fabric stacked on top of one another (i.e., a stack of 2D woven fabric layers).

The two or more layers of 2D woven fabric may be stacked directly on top of one another, for example, such that the two or more layers of 2D woven fabric are in direct contact with one another. Alternatively, the two or more layers of 2D woven fabric may be stacked on top of one another such that the two or more layers of 2D woven fabric are spaced apart from one another by one or more intervening layers. Said one or more intervening layers may comprise one or more layers of non-woven reinforcing fibres, one or more layers of 3D woven fabric, and/or one or more layers of polymeric material (such as thermoplastic polymeric material).

The two or more layers of 2D woven fabric may be two or more layers of the same (i.e., same type of) 2D woven fabric. Alternatively, the two or more layers of 2D woven fabric may comprise two or more layers of different (i.e., different types of) 2D woven fabric.

At least one of the two or more layers of 2D woven fabric comprises the 2D woven fabric comprising the plurality of reinforcing fibre tows and the plurality of thermoplastic polymer yarns woven together. It may be that two or more (e.g., each) of the two or more layers of 2D woven fabric comprise 2D woven fabric comprising a plurality of reinforcing fibre tows and a plurality of thermoplastic polymer yarns woven together.

The two or more layers of 2D woven fabric may be bonded to one another by the polymeric matrix materials. Additionally, the two or more layers of 2D woven fabric may be bonded to one another by the thermoplastic polymeric material.

The plurality of reinforcing fibre tows may have any of the properties of the reinforcing fibre tows described hereinabove with regard to the first aspect.

The thermoplastic polymeric material may comprise (e.g. be, consist of or consist essentially of) one or more of: polyacrylic acids; acrylonitrile butadiene styrene; polyamides; polylactic acids; polycarbonates; polyether sulfones; polyoxymethylene; polyether ether ketones; polyetherimides; polyolefins (i.e., polyalkenes) such as polyethylene and/or polypropylene; polystyrene; polyvinyl chloride; polyvinylidene fluoride; and/or polytetrafluoroethylene.

The thermoplastic polymeric material may comprise (e.g., be, consist of or consist essentially of) a polyamide. The polyamide may be an aliphatic polyamide such as nylon 6 or nylon 6,6 (i.e., PA 6 or PA 66). The polyamide may be a polyphthalamide such as PA 6T. The polyamide may be an aromatic polyamide (i.e., an aramid) such as Kevlar®, Nomex®, Twaron®, Technora® or Kermel®.

The thermoplastic polymeric material may comprise (e.g., be, consist of or consist essentially of) an aliphatic polyamide such as nylon 6 or nylon 6,6 (i.e., PA 6 or PA 66), for example, available in the Grilon® line produced by EMS-GRIVORY, a division of EMS-CHEMIE AG, Switzerland.

The fibre-reinforced composite material may comprise no less than about 1.0 wt. %, for example, no less than about 1.2 wt. %, or no less than about 1.4 wt. %, or no less than about 1.5 wt. %, or no less than about 2.0 wt. %, or no less than about 2.2 wt. %, or no less than about 2.4 wt. %, or no less than about 3.0 wt. %, thermoplastic polymer. The fibre-reinforced composite material may comprise no greater than about 5.5 wt. %, for example, no greater than about 5.4 wt. %, or no greater than about 5.2 wt. %, or no greater than about 5.0 wt. %, or no greater than about 4.0 wt. %, or no greater than about 3.5 wt. %, or no greater than about 3.0 wt. %, or no greater than about 2.6 wt. %, or no greater than about 2.4 wt. %, thermoplastic polymer. The fibre-reinforced composite material may comprise from about 1.0 wt. % to about 5.5 wt. %, for example, from about 1.2 wt. % to about 5.4 wt. %, or from about 1.4 wt. % to about 5.4 wt. %, or from about 1.4 wt. % to about 5.2 wt. %, or from about 1.5 wt. % to about 5.0 wt. %, or from about 2.0 wt. % to about 5.0 wt. %, or from about 1.5 wt. % to about 4.0 wt. %, or from about 2.0 wt. % to about 3.0 wt. %, or from about 2.2 wt. % to about 2.6 wt. %, thermoplastic polymer.

The fibre-reinforced composite material may comprise no less than about 1.0 wt. %, for example, no less than about 1.2 wt. %, or no less than about 1.4 wt. %, or no less than about 1.5 wt. %, or no less than about 2.0 wt. %, or no less than about 2.2 wt. %, or no less than about 2.4 wt. %, or no less than about 3.0 wt. %, aliphatic polyamide such as nylon 6 or nylon 6.6 (i.e., PA 6 or PA 66), for example, available in the Grilon® line produced by EMS-GRIVORY, a division of EMS-CHEMIE AG, Switzerland. The fibre-reinforced composite material may comprise no greater than about 5.5 wt. %, for example, no greater than about 5.4 wt. %, or no greater than about 5.2 wt. %, or no greater than about 5.0 wt. %, or no greater than about 4.0 wt. %, or no greater than about 3.5 wt. %, or no greater than about 3.0 wt. %, or no greater than about 2.6 wt. %, or no greater than about 2.4 wt. %, aliphatic polyamide such as nylon 6 or nylon 6,6 (i.e., PA 6 or PA 66), for example, available in the Grilon® line produced by EMS-GRIVORY, a division of EMS-CHEMIE AG, Switzerland. The fibre-reinforced composite material may comprise from about 1.0 wt. % to about 5.5 wt. %, for example, from about 1.2 wt. % to about 5.4 wt. %, or from about 1.4 wt. % to about 5.4 wt. %, or from about 1.4 wt. % to about 5.2 wt. %, or from about 1.5 wt. % to about 5.0 wt. %, or from about 2.0 wt. % to about 5.0 wt. %, or from about 1.5 wt. % to about 4.0 wt. %, or from about 2.0 wt. % to about 3.0 wt. %, or from about 2.2 wt. % to about 2.6 wt. %, aliphatic polyamide such as nylon 6 or nylon 6,6 (i.e., PA 6 or PA 66), for example, available in the Grilon® line produced by EMS-GRIVORY, a division of EMS-CHEMIE AG, Switzerland.

The fibre-reinforced composite material (e.g., the woven fabric reinforcement) may comprise a plurality of thermoplastic polymer yarns. That is to say, the thermoplastic polymeric material may be provided in the form of a plurality of thermoplastic polymer yarns. The thermoplastic polymer yarns may have any of the properties of the thermoplastic polymer yarns described hereinabove with regard to the first aspect.

The thermoplastic polymer yarns may have been partially or entirely melted.

The thermoplastic polymer may be distributed evenly throughout the fibre-reinforced composite material (e.g., the (e.g., 2D or 3D) woven fabric reinforcement).

The composite component may be an aircraft component.

The composite component may be a component of a gas turbine engine.

The composite component may be manufactured by the method according to the first aspect. The composite component may be formed from the preform according to the second aspect. The composite component may be the composite component according to the third aspect.

According to a fifth aspect, there is provided a woven fabric for use in the manufacture of a composite component, the woven fabric comprising a plurality of reinforcing fibre tows and a plurality of thermoplastic polymer yarns woven together (i.e., interwoven).

The woven fabric may have any of the properties of the woven fabric described hereinabove with regard to the first aspect.

In particular, the woven fabric may be a 2D woven fabric in which the plurality of reinforcing fibre tows and the plurality of thermoplastic polymer yarns are woven into a 2D structure. Alternatively, the woven fabric may be a 3D woven fabric in which the plurality of reinforcing fibre tows and the plurality of thermoplastic polymer yarns are woven into a 3D structure.

The reinforcing fibre tows may have any of the properties of the reinforcing fibre tows described hereinabove with regard to the first aspect.

The thermoplastic polymer yarns may have any of the properties of the thermoplastic polymer yarns described hereinabove with regard to the first aspect.

For example, it may be that: (a) each thermoplastic polymer yarn has a linear density no less than about 110 dtex and/or no greater than about 330 dtex; (b) the woven fabric comprises no less than about 1.0 wt. % and/or no greater than about 5.5 wt. % thermoplastic polymer yarn; and/or (c) the thermoplastic polymer yarns comprise a polyamide.

The woven fabric may be impregnated with partially cured polymeric matrix material and/or one or more precursors for (i.e., which can react to form) polymeric matrix material. The polymeric matrix material is typically a thermosetting polymeric matrix material, such as an epoxy resin, a phenolic resin, an amino resin, a cyanate ester resin, a polyurethane, a polyimide, a polyamide or a bismaleimide. The one or more precursors for the polymeric matrix material may comprise a resin and a hardener. Accordingly, the woven fabric may be a pre-impregnated or "pre-preg" woven fabric.

According to a sixth aspect, there is provided a preform for a composite component, the preform comprising a woven fabric comprising a plurality of reinforcing fibre tows woven together, wherein reinforcing fibre tows of the woven fabric are bonded to one another by thermoplastic polymeric material.

The woven fabric may have any of the properties of the woven fabric described hereinabove with regard to the first aspect.

In particular, the woven fabric may be a 2D woven fabric in which the plurality of reinforcing fibre tows and the plurality of thermoplastic polymer yarns are woven into a 2D structure. Alternatively, the woven fabric may be a 3D woven fabric in which the plurality of reinforcing fibre tows and the plurality of thermoplastic polymer yarns are woven into a 3D structure.

The preform may comprise a plurality of layers. For example, the preform may comprise two or more layers of woven fabric. For example, the preform may comprise two or more layers of 2D woven fabric.

For example, the preform may comprise two or more layers of 2D woven fabric stacked on top of one another (i.e., a stack of 2D woven fabric layers).

The two or more layers of 2D woven fabric may be stacked directly on top of one another, for example, such that the two or more layers of 2D woven fabric are in direct contact with one another. Alternatively, the two or more layers of 2D woven fabric may be stacked on top of one another such that the two or more layers of 2D woven fabric are spaced apart from one another by one or more intervening layers. Said one or more intervening layers may comprise one or more layers of non-woven reinforcing fibres, one or more layers of 3D woven fabric, and/or one or more layers of polymeric material (such as thermoplastic polymeric material).

The two or more layers of 2D woven fabric may be two or more layers of the same (i.e., same type of) 2D woven fabric. Alternatively, the two or more layers of 2D woven fabric may comprise two or more layers of different (i.e., different types of) 2D woven fabric.

At least one of the two or more layers of 2D woven fabric comprises the woven fabric comprising the plurality of reinforcing fibre tows and the plurality of thermoplastic polymer yarns woven together. It may be that two or more (e.g., each) of the two or more layers of 2D woven fabric comprise 2D woven fabric comprising a plurality of reinforcing fibre tows and a plurality of thermoplastic polymer yarns woven together.

The two or more layers of 2D woven fabric may be bonded to one another by the thermoplastic polymeric material.

The preform may be a 2D shaped preform. It will be appreciated that a 2D shaped preform has a macroscopic 2D shape, i.e., the 2D shaped preform is flat or sheet-like.

Alternatively, the preform may be a 3D shaped preform. It will be appreciated that a 3D shaped preform has a macroscopic 3D shape, i.e., the 3D shaped preform is not entirely flat (e.g., not sheet-like).

The plurality of reinforcing fibre tows may have any of the properties of the reinforcing fibre tows described hereinabove with regard to the first aspect.

The thermoplastic polymeric material may comprise (e.g. be, consist of or consist essentially of) one or more of: polyacrylic acids; acrylonitrile butadiene styrene; polyamides; polylactic acids; polycarbonates; polyether sulfones; polyoxymethylene; polyether ether ketones; polyetherimides; polyolefins (i.e., polyalkenes) such as polyethylene and/or polypropylene; polystyrene; polyvinyl chloride; polyvinylidene fluoride; and/or polytetrafluoroethylene.

The thermoplastic polymeric material may comprise (e.g., be, consist of or consist essentially of) a polyamide. The polyamide may be an aliphatic polyamide such as nylon 6 or nylon 6,6 (i.e., PA 6 or PA 66). The polyamide may be a polyphthalamide such as PA 6T. The polyamide may be an aromatic polyamide (i.e., an aramid) such as Kevlar®, Nomex®, Twaron®, Technora® or Kermel®.

The thermoplastic polymeric material may comprise (e.g., be, consist of or consist essentially of) an aliphatic polyamide such as nylon 6 or nylon 6,6 (i.e., PA 6 or PA 66), for example, available in the Grilon® line produced by EMS-GRIVORY, a division of EMS-CHEMIE AG, Switzerland.

The preform may comprise no less than about 1.0 wt. %, for example, no less than about 1.2 wt. %, or no less than about 1.4 wt. %, or no less than about 1.5 wt. %, or no less than about 2.0 wt. %, or no less than about 3.0 wt. %, or no less than about 3.5 wt. %, thermoplastic polymer. The preform may comprise no greater than about 8.0 wt. %, for example, no greater than about 7.5 wt. %, or no greater than about 7.0 wt. %, or no greater than about 6.5 wt. %, or no greater than about 6.0 wt. %, or no greater than about 5.5 wt. %, or no greater than about 5.4 wt. %, or no greater than about 5.2 wt. %, or no greater than about 5.0 wt. %, or no greater than about 4.0 wt. %, thermoplastic polymer. The preform may comprise from about 1.0 wt. % to about 8.0 wt. %, for example, from about 1.0 wt. % to about 7.5 wt. %, or from about 1.2 wt. % to about 5.4 wt. %, or from about 1.4 wt. % to about 5.4 wt. %, or from about 1.4 wt. % to about 5.2 wt. %, or from about 1.5 wt. % to about 5.0 wt. %, or from about 2.0 wt. % to about 5.0 wt. %, or from about 1.5 wt. % to about 4.0 wt. %, thermoplastic polymer.

The preform may comprise no less than about 1.0 wt. %, for example, no less than about 1.2 wt. %, or no less than about 1.4 wt. %, or no less than about 1.5 wt. %, or no less than about 2.0 wt. %, or no less than about 3.0 wt. %, or no less than about 3.5 wt. %, aliphatic polyamide such as nylon 6 or nylon 6,6 (i.e., PA 6 or PA 66), for example, available in the Grilon® line produced by EMS-GRIVORY, a division of EMS-CHEMIE AG, Switzerland. The preform may comprise no greater than about 8.0 wt. %, for example, no greater than about 7.5 wt. %, or no greater than about 7.0 wt. %, or no greater than about 6.5 wt. %, or no greater than about 6.0 wt. %, or no greater than about 5.5 wt. %, or no greater than about 5.4 wt. %, or no greater than about 5.2 wt. %, or no greater than about 5.0 wt. %, or no greater than about 4.0 wt. %, aliphatic polyamide such as nylon 6 or nylon 6,6 (i.e., PA 6 or PA 66), for example, available in the Grilon® line produced by EMS-GRIVORY, a division of EMS-CHEMIE AG, Switzerland. The preform may comprise from about 1.0 wt. % to about 8.0 wt. %, for example, from about 1.0 wt. % to about 7.5 wt. %, or from about 1.2 wt. % to about 5.4 wt. %, or from about 1.4 wt. % to about 5.4 wt. %, or from about 1.4 wt. % to about 5.2 wt. %, or from about 1.5 wt. % to about 5.0 wt. %, or from about 2.0 wt. % to about 5.0 wt. %, or from about 1.5 wt. % to about 4.0 wt. %, aliphatic polyamide such as nylon 6 or nylon 6,6 (i.e., PA 6 or PA 66), for example, available in the Grilon® line produced by EMS-GRIVORY, a division of EMS-CHEMIE AG, Switzerland.

The preform may comprise a plurality of thermoplastic polymer yarns. That is to say, the thermoplastic polymeric material may be provided in the form of a plurality of thermoplastic polymer yarns. The thermoplastic polymer yarns may have any of the properties of the thermoplastic polymer yarns described hereinabove with regard to the first aspect.

The thermoplastic polymer yarns may have been partially or entirely melted.

The thermoplastic polymer may be distributed evenly throughout the preform.

The preform may be manufactured by the method according to the first aspect.

The woven fabric may be a compacted woven fabric. For example, the woven fabric may be a compacted 3D woven fabric.

The composite component may be an aircraft component.

The composite component may be a component of a gas turbine engine.

The composite component may be, for example, a panel, a stator vane, a hollow structure, or a structural frame.

The composite component may be a 2D shaped composite component or a 3D shaped composite component.

According to a seventh aspect, there is provided a method of manufacturing a woven fabric for use in the manufacture of a composite component, the method comprising weaving a plurality of reinforcing fibre tows and a plurality of thermoplastic polymer yarns together.

The method may comprise weaving the plurality of reinforcing fibre tows and the plurality of thermoplastic polymer yarns together into a 2D structure to thereby form a 2D woven fabric. Alternatively, the method may comprise weaving the plurality of reinforcing fibre tows and the plurality of thermoplastic polymer yarns together into a 3D structure to thereby form a 3D woven fabric.

The (e.g., 2D or 3D) woven fabric may have any of the properties of the woven fabric described hereinabove with regard to the first aspect.

The plurality of reinforcing fibre tows may have any of the properties of the reinforcing fibre tows described hereinabove with regard to the first aspect.

The plurality of thermoplastic polymer yarns may have any of the properties of the thermoplastic polymer yarns described hereinabove with regard to the first aspect.

For example, it may be that: (a) each thermoplastic polymer yarn has a linear density no less than about 110 dtex and/or no greater than about 330 dtex; (b) the woven fabric comprises no less than about 1.0 wt. % and/or no greater than about 5.5 wt. % thermoplastic polymer yarn; and/or (c) the thermoplastic polymer yarns comprise a polyamide.

The method may comprise weaving at least some of (e.g., all of) the plurality of thermoplastic polymer yarns in the weft direction. The method may further comprise weaving some of the plurality of thermoplastic polymer yarns in the warp direction (for a 2D or 3D woven fabric) and/or the binder direction (for a 3D woven fabric).

The (e.g., 2D or 3D) woven fabric may be woven using any suitable weaving apparatus. i.e., a loom, such as a Dobby loom or a Jacquard loom. Suitable weaving apparatuses are available from, for example, Lindauer Dornier GmbH, Germany.

In examples in which the woven fabric is a 3D woven fabric, the 3D structure of the 3D woven fabric may be a through-thickness interlock structure or a layer-to-layer interlock structure. It will be appreciated that, in a through-thickness interlock structure, binder reinforcing fibre tows (and/or thermoplastic polymer yarns, if woven in the binder direction) penetrate through the entire thickness of the fabric (i.e. in the z direction), whereas in a layer-to-layer interlock structure, binder reinforcing fibre tows (and/or thermoplastic polymer yarns, if woven in the binder direction) only hold adjacent layers together.

The 3D structure of the 3D woven fabric may be an angle interlock structure or an orthogonal interlock structure. It will be appreciated that, in an angle interlock structure, an interlacing angle between binder reinforcing fibre tows (and/or thermoplastic polymer yarns, if woven in the binder direction) and weft reinforcing fibre tows (and/or thermoplastic polymer yarns, if woven in the weft direction) is less than or greater than about 90°, whereas in an orthogonal interlock structure, the interlacing angle between binder reinforcing fibre tows (and/or thermoplastic polymer yarns, if woven in the binder direction) and weft reinforcing fibre tows (and/or thermoplastic polymer yarns, if woven in the weft direction) is about 90°.

The 2D structure of the 2D woven fabric, or the 3D structure of the 3D woven fabric, may have any suitable weaving pattern, such as plain, twill or satin.

The method may comprise impregnating the woven fabric with partially cured polymeric matrix material and/or one or more precursors for (i.e., which can react to form) polymeric matrix material. The polymeric matrix material is typically a thermosetting polymeric matrix material, such as an epoxy resin, a phenolic resin, an amino resin, a cyanate ester resin, a polyurethane, a polyimide, a polyamide or a bismaleimide. The one or more precursors for the polymeric matrix material may comprise a resin and a hardener. Accordingly, the woven fabric may be a pre-impregnated or "pre-preg" woven fabric.

The skilled person will appreciate that, except where mutually exclusive, a feature or parameter described in relation to any one of the above aspects may be applied mutatis mutandis to any other aspect. Furthermore, except where mutually exclusive, any feature or parameter described herein may be applied to any aspect and/or combined with any other feature or parameter described herein.

BRIEF DESCRIPTION OF THE DRAWINGS

Embodiments will now be described by way of example only, with reference to the Figures, in which.

DETAILED DESCRIPTION OF THE DISCLOSURE

Aspects and embodiments of the present disclosure will now be discussed with reference to the accompanying figures. Further aspects and embodiments will be apparent to those skilled in the art.

Figure 1:
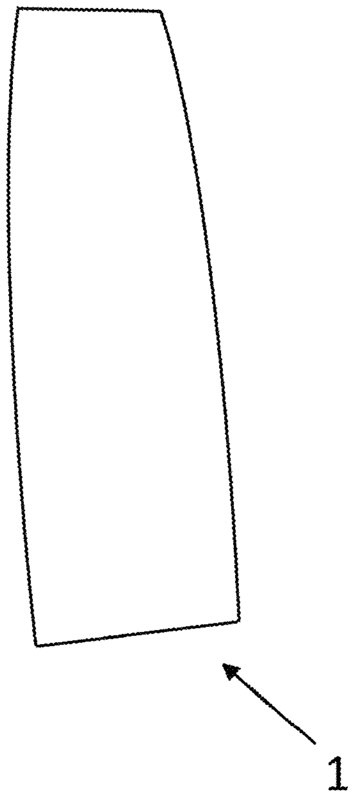
FIG. 1 is a side view of a composite aircraft panel.

FIG. 1 illustrates a composite panel 1 used in the construction of an aircraft. The panel 1 is formed predominantly from a carbon fibre based composite material.

The carbon fibre based composite material, from which the panel 1 is formed, comprises a woven carbon fibre reinforcement in a polymeric matrix. In the example shown in FIG. 1, the woven carbon fibre reinforcement is a 3D woven carbon fibre reinforcement comprising a plurality of carbon fibre tows woven into a 3D structure. At least some of the carbon fibre tows are bonded to one another in part by thermoplastic polymeric material which is different from the polymeric matrix.

Figure 2:
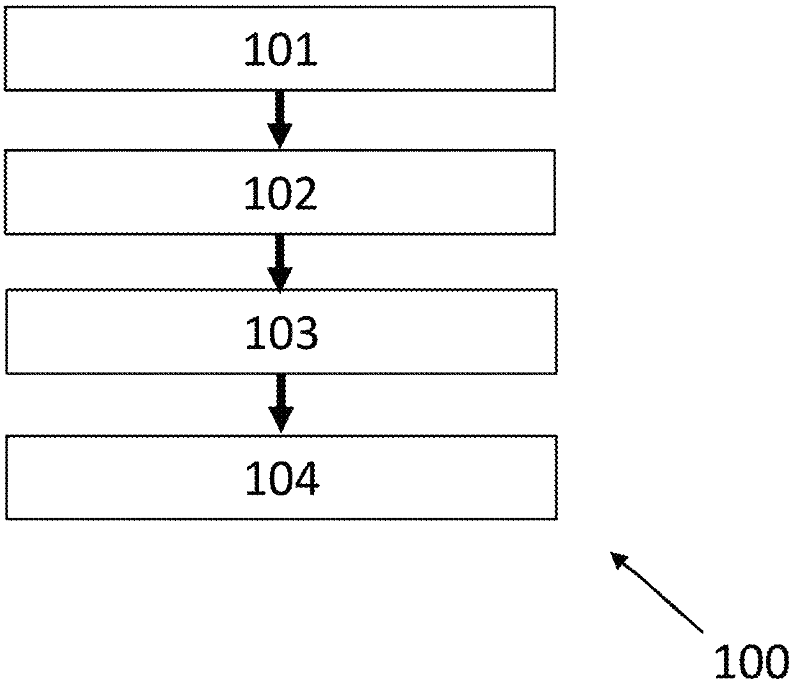
FIG. 2 illustrates a method of manufacturing a composite aircraft panel.

The panel 1 is manufactured by the method 100 outlined in FIG. 2. In step 101, a 3D woven fabric is manufactured. In step 102, the 3D woven fabric is compressed and stabilised by heating in a mould to form a shaped preform for the panel 1. In step 103, the preform is filled with thermosetting polymeric matrix material in a resin transfer mould, thereby forming the panel 1. In optional step 104, a plurality of said panels 1 are assembled and adhered to one another to form part of an aircraft.

The 3D woven fabric used in the manufacture of the example panel shown in FIG. 1 comprises a plurality of carbon fibre tows and a plurality of thermoplastic polymer yarns woven together into a 3D structure. When the 3D woven fabric is compressed and stabilised by heating in the mould, the thermoplastic polymer yarns melt and bond adjacent carbon fibre tows together. The preform therefore retains its compressed, stabilised shape on removal from the mould and transfer to the resin transfer mould.

The 3D woven fabric may have any suitable 3D structure and/or weave pattern. For example, the 3D woven fabric may have a through-thickness interlock structure or a layer-to-layer structure, an angle interlock structure or an orthogonal interlock structure, and/or a plain, twill or satin weave pattern, each of which is known to the person skilled in the art.

In other examples, a composite component may be manufactured using a 2D woven fabric which comprises a plurality of carbon fibre tows and a plurality of thermoplastic polymer yarns woven together into a 2D structure. When the 2D woven fabric is compressed and stabilised by heating in the mould, the thermoplastic polymer yarns melt and bond adjacent carbon fibre tows together. In some examples, a composite component is manufactured by stacking two or more layers of 2D woven fabric on top of one another, wherein some or all of the layers of 2D woven fabric include interwoven thermoplastic polymer yarns. When the layers of 2D woven fabric are compressed and stabilised by heating in the mould, the thermoplastic polymer yarns melt and can bond adjacent carbon fibre tows together and adjacent layers of 2D woven fabric together.

The 2D woven fabric may have any suitable 2D weave pattern. For example, the 2D woven fabric may have a plain, twill or satin weave pattern.

The carbon fibre tows of the 2D or the 3D woven fabric may comprise any suitable number of carbon fibres. For example, the carbon fibre tows may be 1K, 3K, 6K or 12K carbon fibre tows. For example, the carbon fibre tows may be any suitable commercially available carbon fibre tows, such as those obtained from the HexTow® line available from Hexcel Corporation, USA, or the TORAYCA® line available from Toray Composite Materials America, Inc., USA. Alternatively, the carbon fibre may be replaced by other types of reinforcing fibre, such as glass fibre, aramid fibre or basalt fibre.

The thermoplastic polymer yarns of the 2D or the 3D woven fabric may be made of any suitable thermoplastic polymers. For example, the thermoplastic polymer yarns may be made of one or more of: polyacrylic acids; acrylonitrile butadiene styrene; polyamides; polylactic acids; polycarbonates; polyether sulfones; polyoxymethylene; polyether ether ketones; polyetherimides; polyolefins (i.e., polyalkenes) such as polyethylene and/or polypropylene; polystyrene; polyvinyl chloride; polyvinylidene fluoride; and/or polytetrafluoroethylene. More particularly, the thermoplastic polymer yarns may be made of a polyamide such as nylon 6 or nylon 6,6 (i.e., PA 6 or PA 66) or a polyphthalamide such as PA 6T. For example, the thermoplastic polymer yarns may be made of a polyamide available in the Grilon® line produced by EMS-GRIVORY, a division of EMS-CHEMIE AG, Switzerland.

The thermoplastic polymer yarns may have a linear density from about 100 dtex to about 350 dtex, for example. The woven fabric may include from about 1.0 wt. % to about 8.0 wt. %, for example, from about 1.0 wt. % to about 5.5 wt. %, of the thermoplastic polymer yarn.

The thermoplastic polymer yarns may be evenly distributed throughout the 2D or 3D woven fabric. The thermoplastic polymer yarns may be woven into the 2D woven fabric in the warp and/or weft directions or into the 3D woven fabric in any of the warp, weft and/or binder directions. In some examples, the thermoplastic polymer yarns are woven into the 2D or 3D woven fabric in at least the weft direction.

The 2D or 3D woven fabric may be woven using any suitable weaving apparatus, i.e., a loom, such as a Dobby loom or a Jacquard loom. Suitable weaving apparatuses are available from, for example, Lindauer Dornier GmbH, Germany.

In step 102, the woven fabric is heated to a temperature at which the thermoplastic polymer yarns melt. For example, the woven fabric may be heated to a temperature from about 50° C. to about 250° C., such as about 100° C. It may not be necessary to hold the woven fabric at the elevated temperature for a long period of time. For example, the woven fabric may be heated up to the desired maximum temperature (e.g., about 100° C.) and then immediately cooled back down towards room temperature. The total heating time may be from about 10 seconds up to about 10 minutes. The woven fabric is typically cooled prior to removal from the mould, so that the thermoplastic polymer solidifies while the compressed woven fabric is held within the mould, thereby "locking in" the shape of the preform.

In step 103, the preform may be filled with any suitable polymeric matrix material. The polymeric matrix material is typically a thermosetting polymeric matrix material, such as an epoxy resin, a phenolic resin, an amino resin, a cyanate ester resin, a polyurethane, a polyimide, a polyamide or a bismaleimide. The polymeric matrix material may be injected into the preform under pressure within the resin transfer mould. Because the preform has been compressed and stabilised, and because adjacent carbon fibre tows are bonded to one another by thermoplastic polymer, there is typically a low volume fraction of voids and/or air within the preform and injection of the polymeric matrix material is therefore easier and more complete than in conventional manufacturing methods. Any suitable type of resin transfer moulding (e.g., vacuum assisted resin transfer moulding) may be used dependent on the component to be manufactured and the materials used.

It will be appreciated that the manufacturing method outlined hereinabove could be used to manufacture any type of composite component and is not limited to the manufacture of a panel for an aircraft.

In some examples, the shape produced by heating a woven fabric in the mould is essentially the final shape of the composite component being manufactured. For example, the composite component may be manufacture from a single, shaped piece of 3D woven fabric.

In some examples, the composite component is assembled from a plurality of parts in step 104, one or more which parts are made by shaping 2D or 3D woven fabric as disclosed herein.

In some examples, two or more preforms may be adhered to one another before injection of polymeric matrix material. For example, since thermoplastic polymeric material remelts on reheating, two or more preforms, which have been manufactured by compressing and stabilising 2D or 3D woven fabric containing thermoplastic polymeric yarns, can be adhered to one another by placing or compressing the preforms together while the preforms are still warm enough that the thermoplastic polymer is molten or at least tacky.

It will be appreciated that the woven fabrics disclosed herein can be used to manufacture 2D shaped preforms for composite components, 2D shaped composite components or parts thereof, 3D shaped preforms for composite components and/or 3D shaped composite components or parts thereof. Therefore, the woven fabric may be heated in a 2D shaped mould (e.g., between two flat platens) or in a 3D shaped mould as appropriate.

It will also be appreciated that the woven fabrics disclosed herein could be impregnated with partially cured polymeric matrix material and/or one or more precursors for (i.e., which can react to form) polymeric matrix material prior to manufacturing a preform or a composite component. Such pre-impregnated (or "pre-preg") woven fabrics may be suitable for use in manufacturing preforms and/or composite components by methods other than resin transfer moulding. For example, a preform may be assembled by laying up (e.g., multiple layers of) the pre-impregnated woven fabric and a composite component may be produced by curing the preform, for example, by the application of heat and/or pressure (e.g., in an oven or an autoclave). In such examples, the thermoplastic polymer yarn may provide the final composite component with enhanced toughness.

Figure 3:
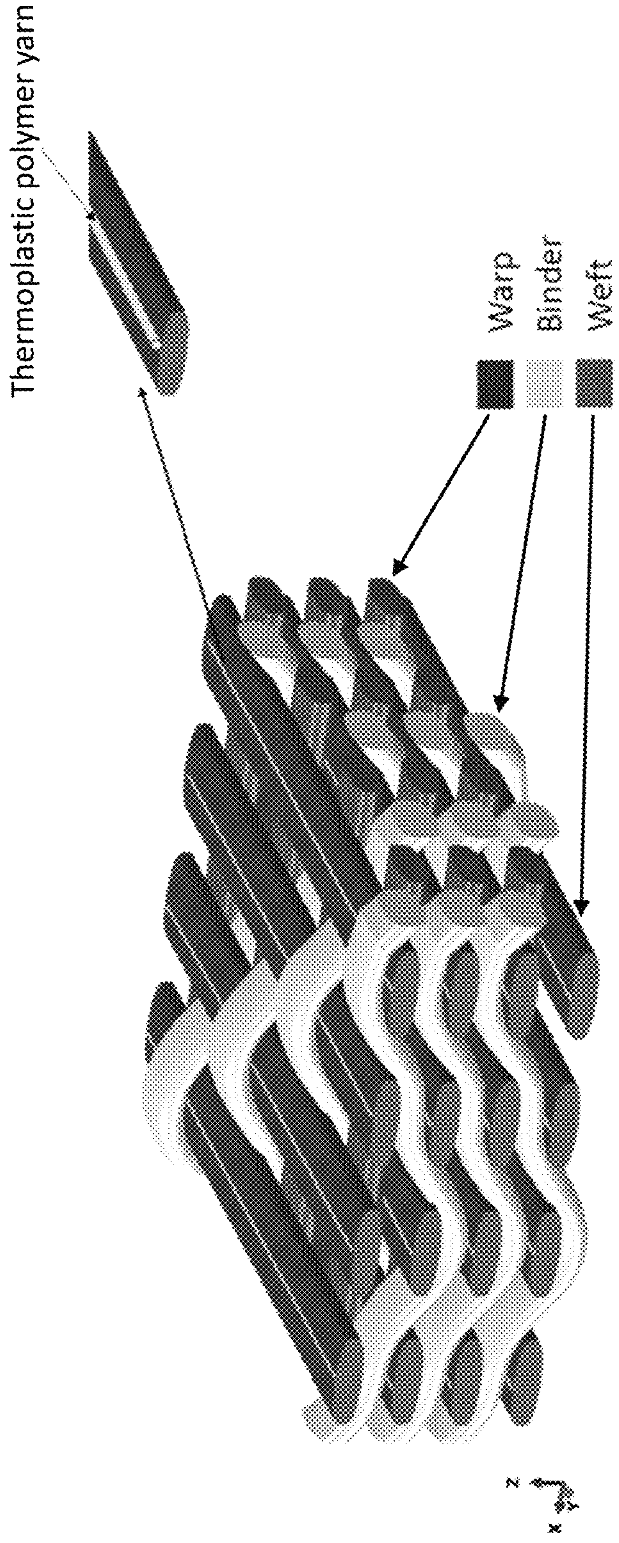
FIG. 3 illustrates a unit cell of a 3D woven structure of a 3D woven fabric.

FIG. 3 illustrates a unit cell of the 3D woven structure of an example 3D woven fabric incorporating one thermoplastic polymer yarn per weft reinforcing fibre tow. In the structure illustrated in FIG. 3, each thermoplastic polymer yarn sits on the surface of a corresponding weft fibre tow. The full 3D woven structure of the fabric can be reproduced by repeating the unit cell shown in FIG. 3 in the x and y directions.

Figure 4:
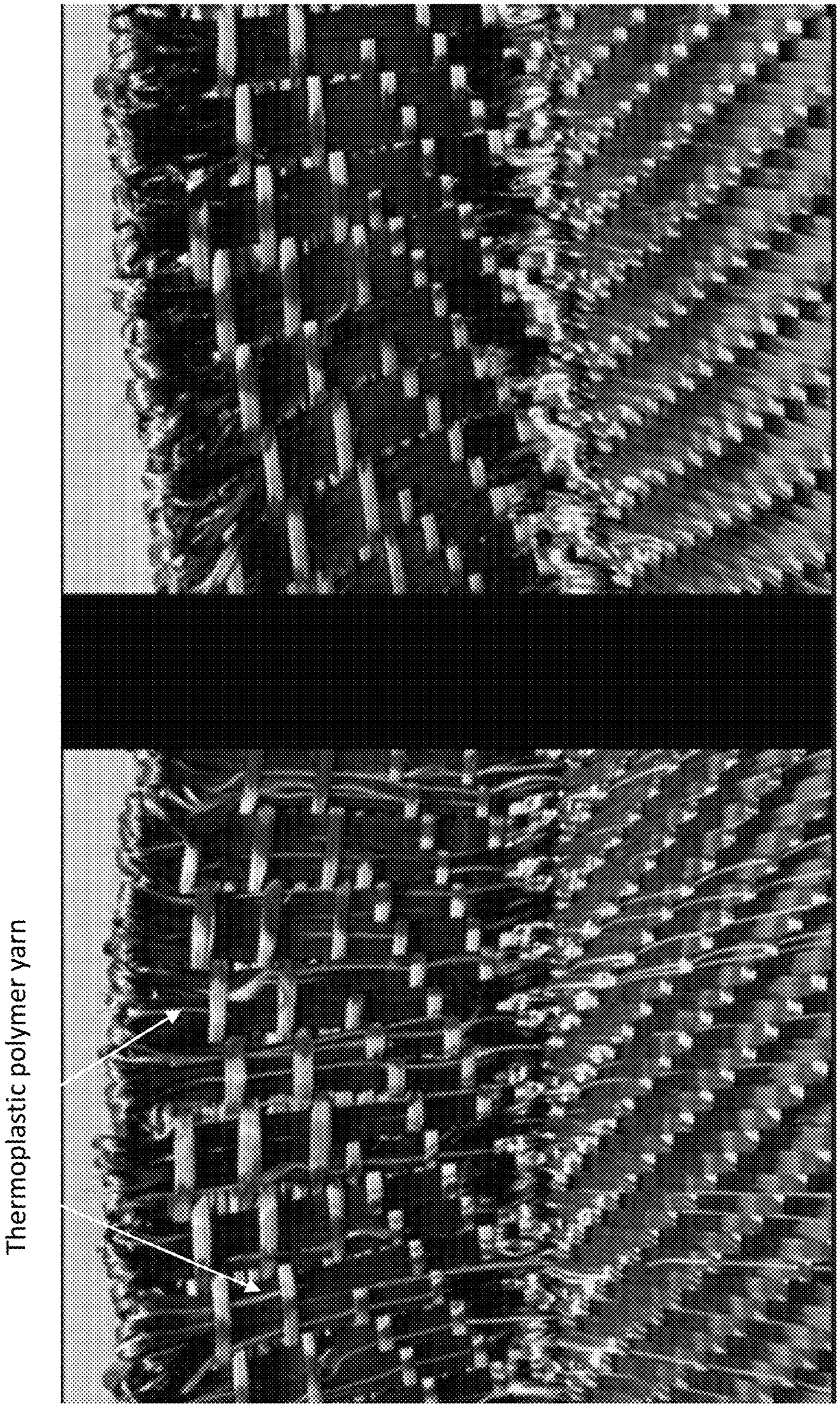
FIG. 4 shows two photographs of a 3D woven fabric incorporating thermoplastic polymer yarns woven in the weft direction, the photograph on the left hand side showing the fabric in the "as woven" state prior to stabilisation and the photograph on the right hand side showing the fabric following stabilisation.

FIG. 4 shows photographs of an example 3D woven fabric incorporating thermoplastic polymer yarns woven in the weft direction. In the photograph on the left hand side, the fabric is in the "as woven" state prior to stabilisation and the thermoplastic polymer yarns are visible as white surface striations as indicated in the Figure. In the photograph on the right hand side, the fabric has been stabilised by the application of heat and pressure, thereby causing the thermoplastic polymer yarns to melt. Individual thermoplastic polymer yarns are no longer visible in the photograph.

As described above, when the thermoplastic polymer yarns melt, they bond adjacent carbon fibre tows together. The preform therefore retains its compressed, stabilised shape on removal from the mould and transfer to the resin transfer mould.

It will be understood that the invention is not limited to the embodiments above-described and various modifications and improvements can be made without departing from the concepts described herein. Except where mutually exclusive, any of the features may be employed separately or in combination with any other features and the disclosure extends to and includes all combinations and sub-combinations of one or more features described herein.

We claim:

1. A manufacturing method comprising:

providing a woven fabric comprising a plurality of reinforcing fibre tows and a plurality of thermoplastic polymer yarns woven together; and moulding the woven fabric in a heated mould to form a preform for a composite component, wherein:

(a) each of the plurality of thermoplastic polymer yarns has a linear density no less than 110 dtex and/or no greater than 250 dtex; and/or (b) the woven fabric comprises no less than 1.0 wt. % and/or no greater than 8.0 wt. % thermoplastic polymer yarn.

2. The manufacturing method of claim 1, wherein the woven fabric is a two-dimensional (2D) woven fabric in which the plurality of reinforcing fibre tows and the plurality of thermoplastic polymer yarns are woven into a 2D structure, and optionally wherein the method comprises:

stacking two or more layers of 2D woven fabric on top of one another to form a stack; and moulding the stack in the heated mould to form the preform for the composite component.

3. The manufacturing method of claim 1, wherein the woven fabric is a three-dimensional (3D) woven fabric in which the plurality of reinforcing fibre tows and the plurality of thermoplastic polymer yarns are woven into a 3D structure.

4. The manufacturing method of claim 1, wherein the mould is a 3D shaped mould and the preform is a 3D shaped preform.

5. The manufacturing method of claim 1, comprising heating the woven fabric to a temperature from 50° C. to 250° C. to form the preform, the method optionally further comprising cooling the preform to no greater than 50° C. prior to removal from the mould.

6. The manufacturing method of claim 1, wherein each thermoplastic polymer yarn comprises a polyamide.

7. The manufacturing method of claim 1, wherein the plurality of thermoplastic polymer yarns are evenly distributed throughout the woven fabric and/or one or more of the plurality of thermoplastic polymer yarns is:

(a) woven into the fabric parallel to a reinforcing fibre tow;

(b) woven into the fabric within a reinforcing fibre tow; or (c) twisted into and/or around a reinforcing fibre tow.

8. The manufacturing method of claim 1, wherein providing the woven fabric comprises weaving the plurality of reinforcing fibre tows and the plurality of thermoplastic polymer yarns together, optionally wherein the method comprises weaving the plurality of thermoplastic polymer yarns in a weft direction.

9. The manufacturing method of claim 1, wherein the plurality of reinforcing fibre tows are carbon fibre tows.

10. The manufacturing method of claim 1, further comprising introducing matrix material into the preform to form a composite component or part thereof.

11. A method of manufacturing a woven fabric for use in the manufacture of a composite component, the method comprising:

weaving a plurality of reinforcing fibre tows and a plurality of thermoplastic polymer yarns together, wherein:

(a) each of the plurality of thermoplastic polymer yarns has a linear density no less than 110 dtex and/or no greater than 250 dtex;

(b) the woven fabric comprises no less than 1.0 wt. % and/or no greater than 5.5 wt. % thermoplastic polymer yarn.

12. The method of claim 11, comprising:

(a) weaving the plurality of reinforcing fibre tows and the plurality of thermoplastic polymer yarns together (i) into a 2D structure to thereby form a 2D woven fabric or (ii) into a 3D structure to thereby form a 3D woven fabric;

(b) weaving one or more of the thermoplastic yarns into the fabric in a weft direction;

(c) distributing the thermoplastic yarns evenly throughout the fabric;

(d) weaving one or more of the thermoplastic yarns into the fabric parallel to a reinforcing fibre tow;

(e) weaving one or more of the thermoplastic yarns woven into the fabric within a reinforcing fibre tow; and/or (f) twisted weaving one or more of the thermoplastic yarns into and/or around a reinforcing fibre tow.

13. The method of claim 11, wherein:

(a) each of the plurality of thermoplastic polymer yarns comprise a polyamide; and/or (b) the plurality of reinforcing fibre tows are carbon fibre tows.

* * * * *